June 29, 1926.
C. L. HOWSE
1,590,194
ELECTRICAL CONTROL SYSTEM
Filed Feb. 4, 1922
2 Sheets-Sheet 1
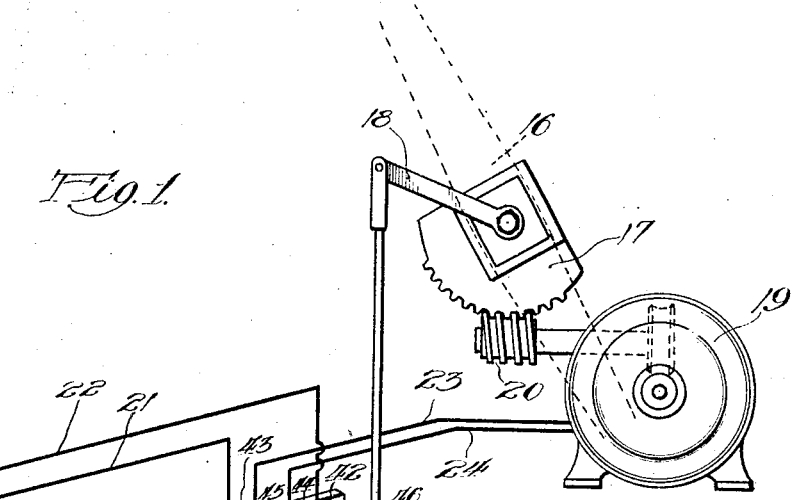
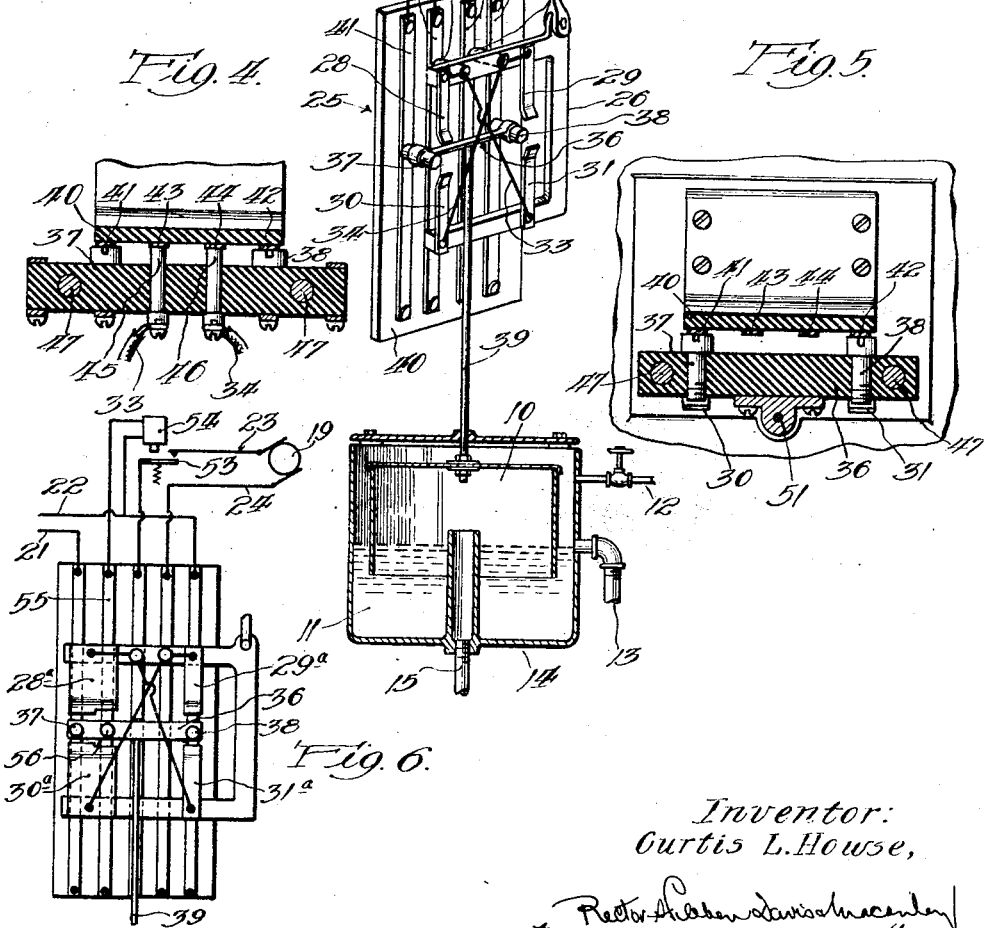
Inventor:
Curtis L. Howse,

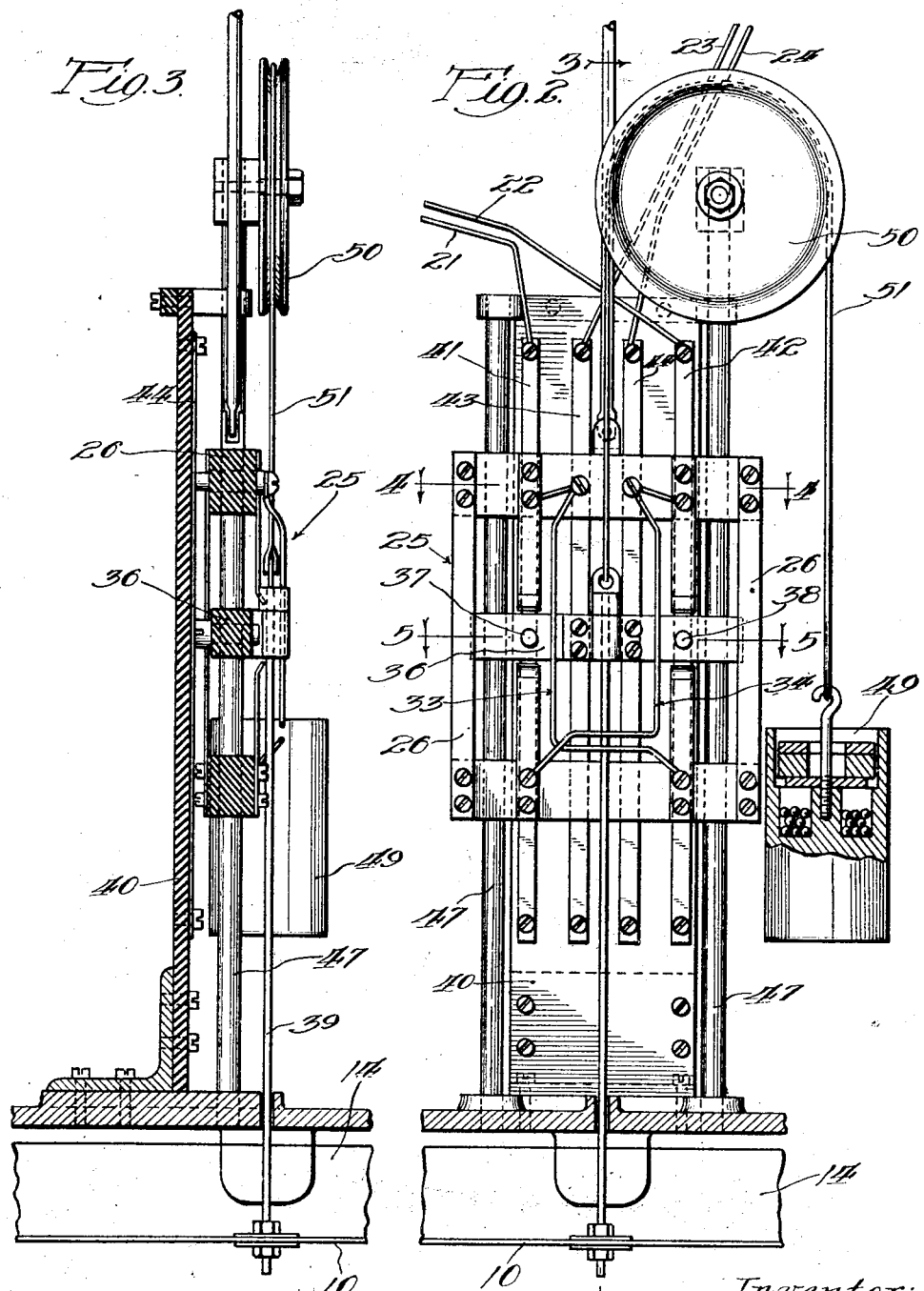

Patented June 29, 1926.

1,590,194

UNITED STATES PATENT OFFICE.

CURTIS L. HOWSE, OF DETROIT, MICHIGAN, ASSIGNOR TO CRAIG DAMPER REGULATOR COMPANY, OF DETROIT, MICHIGAN, A CORPORATION OF DELAWARE.

ELECTRICAL-CONTROL SYSTEM.

Application filed February 4, 1922. Serial No. 534,110.

My invention relates to electrical control systems, for associating a controlling part and a controlled part so that movement of the latter, effected by an electric motor, may be in harmony with the movement of the controlling part.

In some of its aspects my invention relates more particularly to controlling the position or adjustment of a relatively heavy controlled part, such as a furnace-damper, by means of a light, sensitive controlling part, such as a delicate pressure-responsive instrumentality, and I have particularly illustrated my invention as applied to damper-regulation to be effected responsively to movement of a pressure-controlled float.

Among the objects of my invention are to provide operative intermediaries between the controlling and controlled parts for translation of the feeble movements of the controlling part into accordance, but power-impelled movements of the controlled part; and to make such provision in the form of simple, inexpensive, durable and efficient devices. Other and further objects will become apparent to those skilled in the art from the following description taken in conjunction with the accompanying drawings wherein Fig. 1 is a schematic view, with parts in section, illustrating an embodiment of my invention; Fig. 2 is a front elevation of the switch mechanism and related parts; Fig. 3 is a vertical section therethrough on line 3—3 of Fig. 2, and Figs. 4 and 5 are detailed horizontal sections on line 4—4 and 5—5, respectively, of Fig. 2; Fig. 6 shows a modification.

In the drawings 10 indicates a controlling part, specifically, a light, sensitive, pressure-movable element in the form of a float. For damper-regulation this float, of inverted cup-shape, may dip into a water bath 11, maintained at a constant level by suitable supply pipes 12 and overflow pipe 13 opening into the bath container 14; and the hermetically sealed interior of the float 10 may have communication through fixed piping 15 with a variable-pressure point such as the combustion chamber of a forced-draft furnace.

16 represents a damper, as a typical controlled part to be power-moved, it being desirable that, as the float 10 rises and falls in its water bath in response to pressure changes within the combustion chamber of the furnace, the damper shall accordantly by moved toward open or toward closed position for substantial maintenance, at all times, of a damper setting consistent with the pressure-conditions within the combustion chamber. As an effective unit, this damper proper may have mounted thereon or otherwise operatively associated therewith a worm-wheel segment 17 and a lever 18, power to move the damper being supplied from a reversible electric motor 19 through worm gear connections 20 to operate said worm wheel segment, and resultant movement of the damper being communicated by said lever 18 to a suitable part of the control switch mechanism.

The power circuit for the motor 19 is diagrammatically shown as including feed wires 21 and 22 which are switch-connectable to motor connections 23 and 24, the switch structure 25 being of reversing type, so that the direction of operation of the motor 19 will depend upon whether wire 21 is switch-connected to wire 23 or wire 24 (wire 22 of course being connected to the remaining one of the motor wires).

In the switch 25 are two relatively shiftable contact-structures, one movable with the float 10 and the other movable with the damper structure; one of these switch elements including the reversing-contacts and the other including the circuit-closing contacts. As diagrammatically shown in Fig. 1 movable contact element 26 may, specifically, be connected with damper-lever 18 for movement therewith and may carry the contact-spring pairs 28—29 and 30—31 together with cross-connecting wires 33 and 34 respectively connecting springs 28—31 and 29—30. Another movable frame element 36 may carry circuit closing contacts 37 and 38, and is connected, as by vertical rod 39, from movement with float 10. 40 represents an insulating base (which may be mounted directly on top of the receptacle 14) carrying vertical contact strips 41, 42, 43 and 44 that are respectively connected to and form electrical continuations of the wires 21, 22, 23 and 24. Circuit closing contacts 37 and 38 make contact with the extreme strips 41 and 42, while sliding connector elements or contacts 45 and 46 may establish connection between the respective intermediate strips 43 and 44 and the connected reversing-switch couples 28—31 and 29—30.

In the physical structure shown in Figs. 2 and 3 I prefer that both movable-contact-carrying frames 26 and 36 be slidably mounted on lubricated slide rods 47, 47 secured alongside of the insulated base, and further I prefer that the slide-frame element 36 be accurately counter-weighted as by the variable weight 49 connected with said frame by the suitable pulley and cord structure 50, 51.

Operation is as follows: We will assume the balanced conditions shown to be disturbed by rise in pressure communicated to float 10. It, rising in its chamber, lifts the switch-closing contacts 37 and 38 into respective connection with springs 28, 29, thereby closing the circuit 21, 37, 28, 45, 43, 23, 24, 44, 46, 29, 38, 42, 22 and starting the motor 19 to rotate in such direction that it moves damper 16 further open, thus elevating the lever 18. This damper movement continues until movable contact frame 26, carried along with lever 18, withdraws the stated contacts 28 and 29 from connection with the circuit-closing contacts 37 and 38 aforesaid, stopping the motor operation and re-establishing a connection of rest. Or, for converse operation, the pressure affecting the float 10 drops, and the float is lowered, bringing circuit-controlling contacts 37 and 38 into connection with the lower contact springs 30 and 31. A reverse circuit is established for the motor, wire 21 now being connected with motor wire 24 through the path 41, 37, 30, 34, 46, 24, and their return connection being established from wire 23 to wire 22 via connections 43, 45, 33, 31, 38, 42, 22. Accordantly, the motor runs in suitable direction to move the damper 16 towards closed position, thereby lowering lever 18 and the contact-frame 26 carried thereby until the circuit-connections are again interrupted.

Where movements of frame 36 are apt to be minute and slow, so that possibility exists of objectionable arcing when the motor circuit is broken, modification may be made as shown in Fig. 6. The wire 23 of the motor-circuit may include a relay switch 53 closable by a suitable relay-magnet 54 that is connected between wire 22 and an extra strip-contact 55 on the frame. A brush or plug contactor 56 for this strip is mounted on the frame element 36 and spring contacts 28ª and 30ª are widened, almost to their confronting ends, to coact with such contactor 56. Consequently contactor 56 controls the circuit for the relay-magnet and de-energization of the latter opens the motor circuit at switch 53 before the contactor 37 loses contact with blade 28ª or 30ª.

While I have herein described in some detail a particular embodiment of my invention it will be understood by those skilled in the art that numerous changes in detail may be made without departure from the spirit of my invention within the scope of the appended claims.

I claim:

1. In a control system of the character described, a reversible motor, a switch therefor comprising four fixed contact strips and two contact frames mounted to slide with reference thereto, one said frame carrying opposed pairs of contacts diagonally cross-connected and making sliding connection with one pair of contact strips, the other said frame carrying circuit-closing contacts making sliding contact with the other pair of contact strips movable into engagement with either contact spring of a respective pair on the other said frame, a controlling part connected with one said frame, and a motor operated controlled part connected with the other said frame.

2. In a damper regulator of the character described, the combination of a light, highly sensitive float device, a damper, a reversible motor having connections to move said damper, a circuit controlling the switch for said motor comprising a fixed base having four fixed contact strips thereon and further comprising two contact frames mounted to slide longitudinally with respect to said strips and also with respect to each other, one said frame carrying opposed pairs of contacts diagonally cross-connected and making sliding connection with one pair of contact strips, the other said frame carrying circuit-closing contacts making sliding constant contact with the other pair of contact strips and movable into or out of engagement with either pair of contacts on the other said frame, the one said frame being connected with said float device and the other said frame connected for operation by said motor.

3. Structure as set forth in claim 2 wherein the switch has a supplementary contact strip and the two frames have supplementary contacts, for controlling a relay, and a relay controlled thereby for breaking the motor circuit extraneously to the switch-contact.

CURTIS L. HOWSE.